United States Patent
Ki et al.

(10) Patent No.: US 12,061,387 B2
(45) Date of Patent: Aug. 13, 2024

(54) DISPLAY APPARATUS

(71) Applicant: Samsung Display Co., Ltd., Yongin-si (KR)

(72) Inventors: Boo-kan Ki, Yongin-si (KR); Hoyun Byun, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/105,255

(22) Filed: Feb. 3, 2023

(65) Prior Publication Data

US 2023/0176413 A1 Jun. 8, 2023

Related U.S. Application Data

(63) Continuation of application No. 17/473,862, filed on Sep. 13, 2021, now Pat. No. 11,609,449, which is a
(Continued)

(30) Foreign Application Priority Data

Sep. 21, 2017 (KR) ........................ 10-2017-0122055

(51) Int. Cl.
    *G02F 1/1335* (2006.01)
    *G02F 1/13363* (2006.01)

(52) U.S. Cl.
    CPC .. *G02F 1/133504* (2013.01); *G02F 1/133553* (2013.01); *G02F 1/13363* (2013.01);
    (Continued)

(58) Field of Classification Search
    CPC . G02B 6/0038; G02B 6/005; G02F 1/133606; G02F 2001/133607
    See application file for complete search history.

(56) References Cited

U.S. PATENT DOCUMENTS 6,414,735 B1   7/2002 Kim et al.
6,822,711 B1  11/2004 Yoshida et al.
(Continued)

FOREIGN PATENT DOCUMENTS

JP  2001-194514   7/2001
KR  10-0393749    8/2003
(Continued)

OTHER PUBLICATIONS

Non-Final Office Action dated Jun. 5, 2019, issued to U.S. Appl. No. 15/969,783.
(Continued)

*Primary Examiner* — Mariam Qureshi
(74) *Attorney, Agent, or Firm* — CANTOR COLBURN LLP

(57) ABSTRACT

A display apparatus including a display panel having a display surface on which an image is displayed, and a light condensing member disposed on an upper portion of the display surface. The light condensing member includes a lower condensing layer having a plurality of protrusions protruding upward, and an upper condensing layer having a higher refractive index than the lower condensing layer and disposed on an upper portion of the lower condensing layer to cover the top surface of the lower condensing layer. The protrusions include an upper surface having a planar shape, and a side surface extending downward from an edge of the upper surface and having a curved shape.

12 Claims, 11 Drawing Sheets

Related U.S. Application Data continuation of application No. 17/000,342, filed on Aug. 23, 2020, now Pat. No. 11,137,632, which is a continuation of application No. 15/969,783, filed on May 3, 2018, now Pat. No. 10,782,549.

(52) U.S. Cl.
CPC .. *G02F 1/133528* (2013.01); *G02F 1/133548* (2021.01); *G02F 1/133562* (2021.01); *G02F 1/133638* (2021.01)

(56) References Cited

U.S. PATENT DOCUMENTS

| | | | |
|---|---|---|---|
| 6,844,956 | B2 | 1/2005 | Minoura et al. |
| 7,184,114 | B2* | 2/2007 | Hong ............... G02F 1/134363 359/620 |
| 9,454,035 | B2 | 9/2016 | Tamaki |
| 2006/0221634 | A1* | 10/2006 | Sato ................. G02B 6/0053 362/611 |
| 2007/0008459 | A1 | 1/2007 | Park et al. |
| 2007/0153377 | A1* | 7/2007 | Goto ............... G02F 1/133524 359/460 |
| 2007/0176195 | A1 | 8/2007 | Kuiseko et al. |
| 2008/0049166 | A1* | 2/2008 | Ha ..................... B32B 37/06 349/64 |
| 2008/0180599 | A1 | 7/2008 | Ha et al. |
| 2011/0051044 | A1* | 3/2011 | Segawa ............. G02B 5/0215 349/64 |
| 2013/0163277 | A1* | 6/2013 | Kim ..................... F21V 5/02 362/602 |
| 2016/0178810 | A1* | 6/2016 | Chung ............... G02B 3/005 359/741 |
| 2016/0202553 | A1 | 6/2016 | Jo et al. |
| 2016/0202395 | A1* | 7/2016 | Lee .................. G02F 1/133602 359/599 |
| 2017/0153362 | A1 | 6/2017 | Cho et al. |
| 2018/0329262 | A1 | 11/2018 | Yata et al. |

FOREIGN PATENT DOCUMENTS

| | | |
|---|---|---|
| KR | 10-0404060 | 11/2003 |
| KR | 10-0421902 | 9/2004 |
| KR | 10-2007-0007418 | 1/2007 |
| KR | 10-1004468 | 12/2010 |
| KR | 10-1207892 | 12/2012 |
| KR | 10-1544275 | 8/2015 |
| KR | 10-2016-0087992 | 7/2016 |
| KR | 10-1707961 | 2/2017 |

OTHER PUBLICATIONS

Final Office Action dated Oct. 24, 2019, issued to U.S. Appl. No. 15/969,783.
Notice of Allowance dated May 20, 2020, issued to U.S. Appl. No. 15/969,783.
Non-Final Office Action dated Mar. 11, 2021, issued to U.S. Appl. No. 17/000,342.
Notice of Allowance dated Jun. 3, 2021, issued to U.S. Appl. No. 17/000,342.
Non-Final Office Action dated Apr. 1, 2022, in U.S. Appl. No. 17/473,862.
Final Office Action dated Jul. 1, 2022, in U.S. Appl. No. 17/473,862.
Notice of Allowance dated Oct. 26, 2022, in U.S. Appl. No. 17/473,862.

* cited by examiner

DISPLAY APPARATUS

CROSS-REFERENCE TO RELATED APPLICATIONS

This application is a continuation of U.S. patent application Ser. No. 17/473,862, filed on Sep. 13, 2021, which is a continuation of U.S. patent application Ser. No. 17/000,342, filed on Aug. 23, 2020, now issued as U.S. Pat. No. 11,137,632, which is a continuation of U.S. patent application Ser. No. 15/969,783, filed on May 3, 2018, now issued as U.S. Pat. No. 10,782,549, which claims priority from and the benefit of Korean Patent Application No. 10-2017-0122055, filed on Sep. 21, 2017, which are hereby incorporated by reference for all purposes as if fully set forth herein.

BACKGROUND

Field

Exemplary embodiments of the inventive concepts relate to a display apparatus having improved display quality.

Discussion of the Background

Electronic devices, such as a mobile communication terminal, a digital camera, a laptop computer, and a TV, typically include a display apparatus for displaying an image.

In general, a display apparatus includes a display panel for generating an image and a backlight unit for providing light to the display panel. The display panel adjusts the transmittance of the light provided from the backlight unit to display an image.

A backlight unit may be classified into an edge-type backlight unit, which provides light to a display panel from a side surface of the display panel, and a direct-type backlight unit, which provides light to a display panel from a lower portion of the display panel. The edge-type backlight unit includes a light source for generating light, and a light guide plate for guiding the direction of the light source and the light. The light source is disposed at one side of the light guide plate, and the light guide panel guides the light generated from the light source to the display panel.

The above information disclosed in this Background section is only for understanding of the background of the inventive concepts, and, therefore, it may contain information that does not constitute prior art.

SUMMARY

Exemplary embodiments of the inventive concepts provide a display apparatus having improved display quality.

Additional features of the inventive concepts will be set forth in the description which follows, and in part will be apparent from the description, or may be learned by practice of the inventive concepts.

An exemplary embodiment of the inventive concepts provides a display apparatus including a display panel having a display surface on which an image is displayed, and a light condensing member disposed on an upper portion of the display surface. The light condensing member includes a lower condensing layer having a plurality of protrusions protruding upward, and an upper condensing layer having a higher refractive index than the lower condensing layer and disposed on an upper portion of the lower condensing layer to cover the top surface of the lower condensing layer. Each of the protrusions has an upper surface having a planar shape, and a side surface extending downward from an edge of the upper surface and having a curved shape.

The display apparatus may further include a first polarizing member disposed on an upper portion of the display panel and transmitting one polarization component of the light provided from the display panel.

The display panel may include a first substrate having a plurality of pixel electrodes disposed thereon, a second substrate facing the first substrate and having a common electrode disposed thereon, and a liquid crystal layer interposed between the first substrate and the second substrate. The pixel electrodes may have a reflective material.

The first polarizing member may include a polarizing layer for transmitting one polarization component of the light provided from the display panel, a phase delay layer interposed between the polarizing layer and the display panel and changing the polarization state of the light provided from the display panel.

The phase delay layer may include at least one of a half-wave film and a quarter-wave film.

The light condensing member may be disposed on an upper portion of the first polarizing member.

The display panel may include a first substrate having a plurality of pixel electrodes disposed thereon, a second substrate facing the first substrate and having a common electrode disposed thereon, a polarizing layer interposed between the common electrode and the second substrate, and a liquid crystal layer interposed between the common electrode and the first substrate.

The lower condensing layer may have a plate shape and may further include a base layer having the protrusions disposed on the top surface thereof.

Each of the protrusions may have a curved surface shape protruding outward from each of the protrusions.

Each of the protrusions may increase in width as facing downward from the upper surface.

The protrusions may be arranged in a first direction on a plane, and a height of each of the protrusions may be greater than or equal to a width of the upper surface in the first direction.

The protrusions may be arranged in a first direction on a plane, and each of the protrusions may be extended in a second direction crossing the first direction The protrusions may be arranged in a matrix form on a plane.

The light condensing member may be provided in plurality, and the plurality of light condensing members may include a first light condensing member having a first protrusions arranged in a first direction and extending in a second direction crossing the first direction, and a second light condensing member having second protrusions disposed an upper portion of the first light condensing member, arranged in the second direction, and extending in the first direction.

The display apparatus may further include a backlight unit disposed on a lower portion of the display panel to provide light to the display panel.

The display apparatus may further include a first adhesive member disposed on a lower portion of the lower condensing layer and having a plurality of diffusion beads.

The lower condensing layer may include an adhesive material.

The lower condensing layer may further include a plurality of diffusion beads.

Another exemplary embodiment of the inventive concepts provides a display apparatus including a display panel for displaying an image, a first polarizing member disposed on an upper portion of the display panel and transmitting one polarization component of the light provided from the display panel, and a light condensing member disposed on an upper portion of the first polarizing member, or disposed between the first polarizing member and the display panel. The light condensing member includes a lower condensing layer having a plurality of protrusions arranged in one direction, and an upper condensing layer having a higher refractive index than the lower condensing layer and disposed on an upper portion of the lower condensing layer to cover the lower condensing layer. A side surface of each of the protrusions has a curved surface shape protruding outward and the width of each of the protrusions is less than or equal to the height of each of the protrusions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification. The drawings illustrate exemplary embodiments of the inventive concepts and, together with the description, serve to explain principles of the inventive concepts.

DETAILED DESCRIPTION

Figure 1:
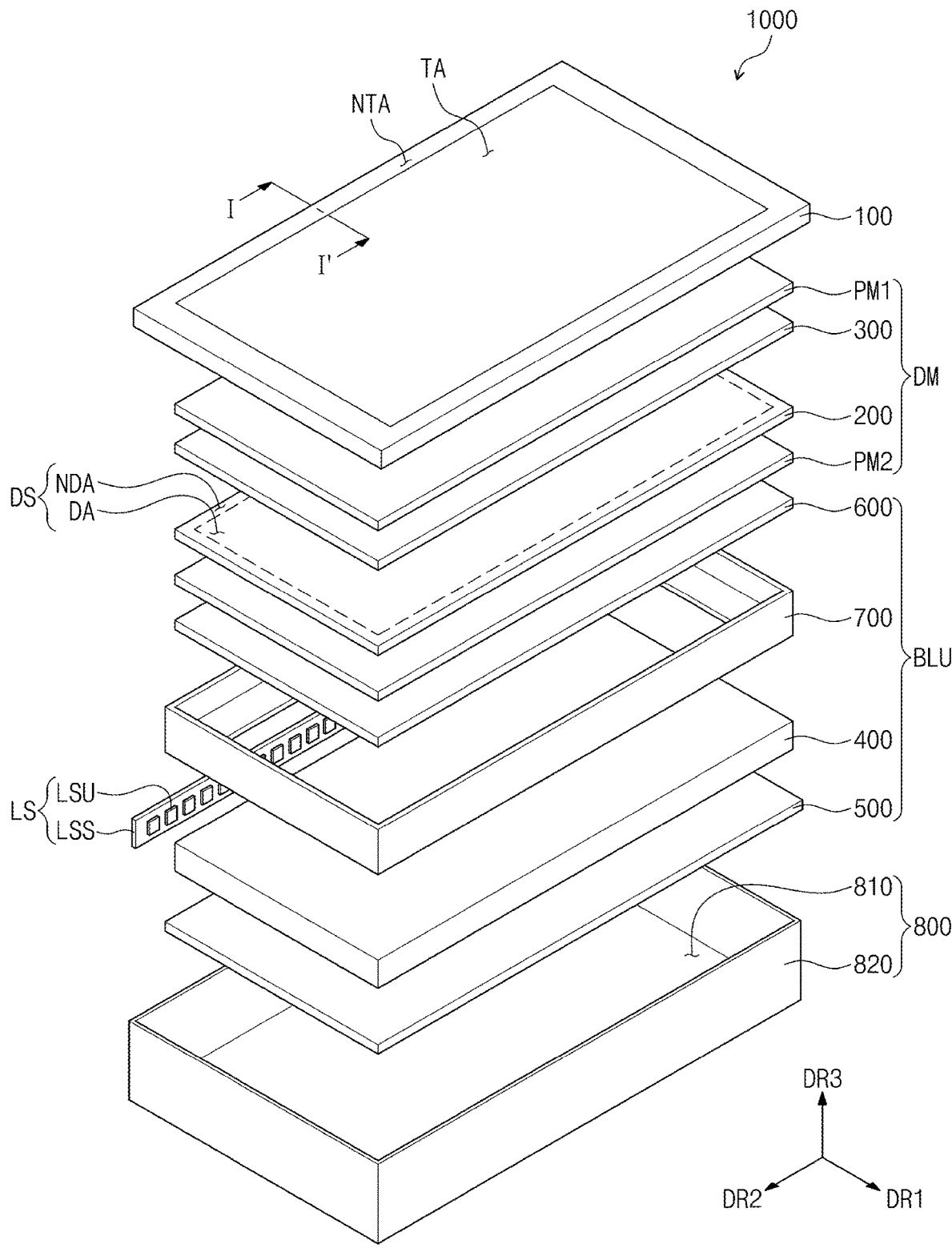
FIG. 1 is an exploded perspective view of a display apparatus according to an exemplary embodiment of the inventive concepts.

In the following description, for the purposes of explanation, numerous specific details are set forth in order to provide a thorough understanding of various exemplary embodiments of the invention. As used herein, "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concepts will be described in detail with reference to the accompanying drawings.

Figure 2:
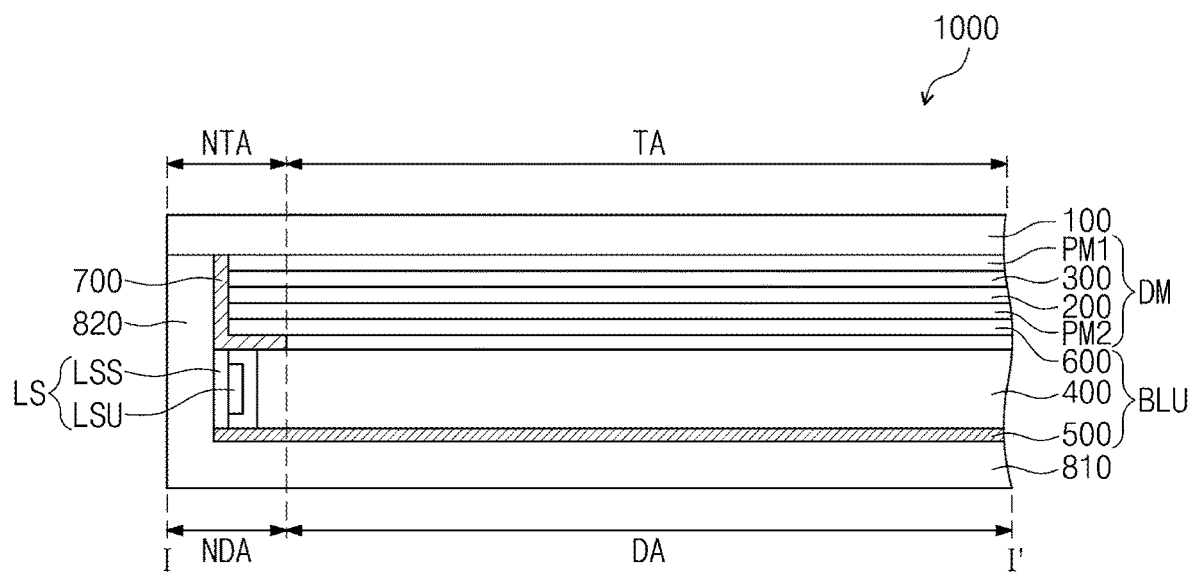
FIG. 2 is a cross-sectional view taken along line I-I' shown in FIG. 1.
Figure 2:
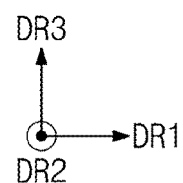

FIG. 1 is an exploded perspective view of a display apparatus according to an exemplary embodiment of the inventive concepts, and FIG. 2 is a cross-sectional view taken along line I-I' shown in FIG. 1.

Referring to FIGS. 1 and 2, a display apparatus 1000 according to an exemplary embodiment of the inventive concepts has a rectangular shape which has a short side in a first direction DR1 and a long side in a second direction DR2. However, the display apparatus 1000 is not limited thereto, and may have various shapes.

The display apparatus 1000 includes a window member 100, a display module DM, a backlight unit BLU, and a receiving member 800.

For convenience of explanation, a direction in which an image is provided in the display apparatus 1000 is defined as an upper direction, and the opposite direction of the upper direction is defined as a lower direction. In this exemplary embodiment, the upper and lower directions are parallel to a third direction DR3 which is defined as a direction orthogonal to the first direction DR1 and the second direction DR2. The third direction DR3 may be a reference direction which distinguishes between a front surface and a rear surface of components to be described later. However, the upper direction or the lower direction is a relative concept and may be converted to another direction.

The window member 100 includes a light transmitting area TA for transmitting an image provided by the display module DM, and a light shielding area NTA adjacent to the light transmitting area TA and not transmitting an image. The light transmitting area TA is disposed at the center of the display apparatus 1000 on a plane defined by the first direction DR1 and the second direction DR2. The light shielding area NTA is disposed at the periphery of the light transmitting area TA and has a frame shape surrounding the light transmitting area TA.

According to another exemplary embodiment of the inventive concepts, the window member 100 of the display apparatus 1000 includes only the light transmitting area TA. That is, the light shielding area NTA may be omitted. In this case, an image may be transmitted through the entire top surface of the window member 100.

The window member 100 may be made of a material including glass, sapphire, or plastic.

The display module DM is disposed on a lower portion of the window member 100. The display module DM displays an image using the light provided from the backlight unit BLU. The display module DM will be further described below with reference to FIG. 3.

The backlight unit BLU is disposed on a lower portion of the display module DM, and provides light to the display module DM. According to this exemplary embodiment, the backlight unit BLU may be an edge-type backlight unit. However, the inventive concepts are not limited thereto. For example, a backlight unit according to another exemplary embodiment may be a direct-type backlight unit.

The backlight unit BLU includes a light source LS, a light guiding member 400, a reflecting member 500, an optical member 600, and a mold frame 700.

The light source LS is disposed at one side of the light guiding member 400 in the first direction DR1. However, the position of the light source LS is not so limited in the inventive concepts, and may be disposed adjacent to at least any one side surface of the side surfaces of the light guiding member 400.

The light source LS includes a plurality of light source units LSU and a light source substrate LSS. The light source units LSU generate light to be provided to the display module DM, and provide the light to the light guiding member 400.

According to this exemplary embodiment, the light source units LSU may be in a form in which a light emitting diode (LED) is used a point light source. However, the inventive concepts are not limited to this type of the light source units LSU.

In addition, the inventive concepts are not limited to the number of the light source units LSU. According to another exemplary embodiment, the light source unit LSU may be provided with one LED, not a plurality of LEDs, as a point light source, or may be provided with a plurality of LED groups. Also, according to another exemplary embodiment, the light source units LSU may be linear light sources.

The light source units LSU may be mounted on the light source substrate LSS. The light source substrate LSS is disposed to face one side of the light guiding member 400 in the first direction DR1, and is extended in the second directions DR2. The light source substrate LSS may include a light source controlling unit (not shown) connected to the light source units LSU. The light source controlling unit (not shown) analyzes an image displayed on the display module DM to output a local dimming signal, and may control the brightness of light generated by the light source units LSU in response to the local dimming signal. In another exemplary embodiment of the inventive concepts, the light source controlling unit (not shown) may be provided being mounted on a separate circuit board, and thus, the position thereof is not particularly limited.

The light guiding member 400 may have a plate shape. The light guiding member 400 changes the traveling direction of the light provided from the light source unit LSU so as to be directed to an upper portion on which the display module DM is disposed. Although not shown in the drawings, the light guiding member 400 may have a diffusion pattern (not shown) formed on a lower surface of the light guiding member 400.

The light guiding member 400 includes a material having high light transmittance in the visible light region. For example, the light guiding member 400 may include a glass material. In another exemplary embodiment, the light guiding member 400 may be formed of a transparent polymer resin, such as polycarbonate or polymethyl methacrylate (PMMA).

The reflecting member 500 is disposed on a lower portion of the light guiding member 400. The reflecting member 500 reflects the light emitted from a lower portion of the light guiding member 400 toward the upper direction. The reflecting member 500 includes a material for reflecting light. For example, the reflecting member 500 may include aluminum or silver.

The optical member 600 is disposed between the light guiding member 400 and the display module DM. The optical member 600 performs a function of diffusing or condensing the light provided from the light guiding member 400.

In FIGS. 1 and 2, one optical member 600 is illustrated, but the inventive concepts are not so limited, and the optical member 600 may be provided in plurality. For example, the plurality of optical members 600 may include a diffusion sheet, a prism sheet, and a protection sheet. The diffusion sheet may diffuse the light provided from the light guiding member 400. The prism sheet may condense the light diffused by the diffusion sheet in the upper direction perpendicular to a plane. The protection sheet may protect the prism sheet from external friction.

The mold frame 700 is disposed between the light guiding member 400 and the optical member 600. In this exemplary embodiment, the mold frame 700 has a frame shape. The mold frame 700 overlaps, on a plane, the light shielding area NTA of the window member 100 and a non-display region NDA of a display panel 200. Specifically, the mold frame 700 may be disposed to correspond to the outermost region on the top surface of the light guiding member 400.

The display module DM and the optical member 600 may be seated on the mold frame 700. The mold frame 700 serves a role to fix the display module DM, the optical member 600, and the backlight unit BLU.

The receiving member 800 is disposed at the lowermost position of the display apparatus 1000 to receive the backlight unit BLU. The receiving member 800 includes a bottom portion 810 and a plurality of side wall portions 820 connected to the bottom portion 810. In an exemplary embodiment of the inventive concepts, the light source LS may be disposed on one inner side surface of the side wall portions 820 of the receiving member 800. The receiving member 800 may include a metal having rigidity.

Figure 3:
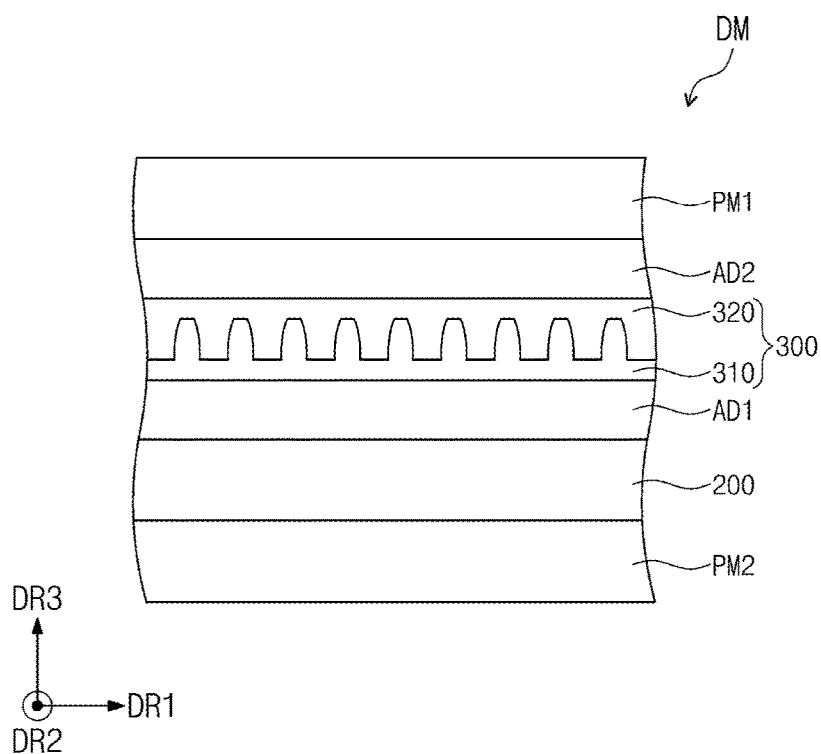
FIG. 3 is an enlarged cross-sectional view of a display module according to an exemplary embodiment of the inventive concepts.
Figure 4:
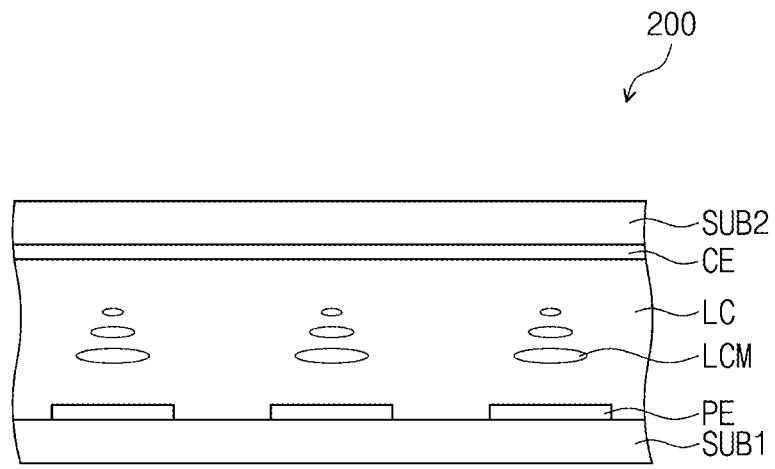
FIG. 4 is an enlarged cross-sectional view of a display panel according to an exemplary embodiment of the inventive concepts.

FIG. 3 is an enlarged cross-sectional view of a display module according to an exemplary embodiment of the inventive concepts, and FIG. 4 is an enlarged cross-sectional view of a display panel according to an exemplary embodiment of the inventive concepts.

Referring to FIGS. 3 and 4 together with FIGS. 1 and 2, the display module DM includes the display panel 200, a first polarizing member PM1, a second polarizing member PM2, and a light condensing member 300.

The display panel 200 displays an image using the light provided from the backlight unit BLU. That is, the display panel 200 may be a receiving type display panel. For example, the display panel 200 may be a liquid crystal display panel (LCD).

On a plane, a surface of the display panel 200, which is the surface on which an image is displayed, is defined as a display surface DS. The display surface DS includes, on the display surface DS, a display region DA on which an image is displayed, and the non-display region NDA on which an image is not displayed. The display region DA is defined, on the plane, at the center of the display module DM, and overlaps the light transmitting area TA of the window member 100.

The display panel 200 includes a first substrate SUB1, a second substrate SUB2, and a liquid crystal layer LC.

The first substrate SUB1 is disposed on an upper portion of the backlight unit BLU. The first substrate SUB1 may be formed of a material having high light transmittance so as to easily transmit the light provided from the backlight unit BLU. For example, the first substrate SUB1 may be a transparent glass substrate, a transparent plastic substrate, or a transparent film.

Although not shown, on the plane, at least one pixel region (not shown) and a non-pixel region (not shown) adjacent to the pixel region are defined. In this exemplary embodiment, the pixel region is provided in plurality, and the non-pixel region may be defined between the pixel regions.

The first substrate SUB1 includes a plurality of pixel electrodes PE. The pixel electrodes PE are disposed to correspond one-to-one to the pixel regions (not shown). Although not shown, the first substrate SUB1 further includes a plurality of thin film transistors (not shown) electrically connected in one-to-one correspondence to the pixel electrodes PE. The thin film transistors may be respectively connected to the pixel electrodes PE to switch a driving signal provided to each pixel electrode PE.

The second substrate SUB2 is disposed on an upper portion of the first substrate SUB1 to face the first substrate SUB1. The liquid crystal layer LC may be interposed between the second substrate SUB2 and the first substrate SUB1. The liquid crystal layer LC includes a plurality of liquid crystal molecules LCM arranged in a predetermined direction.

The second substrate SUB2 includes a common electrode CE forming an electric field for controlling the arrangement of the liquid crystal molecules LCM together with the pixel electrodes PE. The display panel 200 drives the liquid crystal layer LC to display an image in the third direction DR3, which is the upper direction.

Although not shown, the display module DM may be provided with a driving chip for providing a driving signal, a tape carrier package (TCP) on which the driving chip is mounted, and a printed circuit substrate which is electrically connected to the display panel 200 through the tape carrier package.

The first polarizing member PM1 and the second polarizing member PM2 are disposed on an upper portion and on a lower portion of the display panel 200. Specifically, the first polarizing member PM1 is disposed on an upper portion of the display panel 200, and the second polarizing member PM2 is disposed on a lower portion of the display panel 200. Although not shown in the drawings, the first polarizing member PM1 and the second polarizing member PM2 respectively include a polarizing layer (not shown). The polarizing layer (not shown) may have a predetermined optical axis.

Specifically, the polarizing layer of the second polarizing member PM2 polarizes the component of the light provided from the backlight unit BLU. The polarizing layer of the second polarizing member PM2 may have a second transmission axis (not shown) having a predetermined direction. That is, of the light provided from the backlight unit BLU, only the polarization component parallel to the second transmission axis may be transmitted through the second polarizing member PM2.

The polarizing layer of the first polarizing member PM1 polarizes the component of the light provided from the display panel 200. The first polarizing member PM1 may have a first transmission axis (not shown) having a predetermined direction. That is, of the light provided from the display panel 200, only the polarization component parallel to the first transmission axis may be transmitted through the first polarizing member PM1.

In the inventive concepts, according to the arrangement mode of the liquid crystal molecules LCM, an angle formed by the first transmission axis and the second transmission axis may be set. For example, the first transmission axis may be perpendicular to the second transmission axis on a plane.

The light condensing member 300 is disposed between the display panel 200 and the first polarizing member PM1. The light condensing member 300 serves a role to condense the light provided from the display panel 200 in the upper direction. The light condensing member 300 according to an exemplary embodiment has a form in which layers having different refractive indexes are coupled. The light condensing member 300 will be described in more detail below with reference to FIGS. 5 to 7.

The display module DM according to this exemplary embodiment may further include a first adhesive member AD1 and a second adhesive member AD2. The first adhesive member AD1 and the second adhesive member AD2 may include an adhesive material.

The first adhesive member AD1 is disposed between the display panel 200 and the light condensing member 300 to couple the display panel 200 with the light condensing member 300. The second adhesive member AD2 is disposed between the light condensing member 300 and the first polarizing member PM1 to couple the light condensing member 300 with the first polarizing member PM1.

Figure 5:
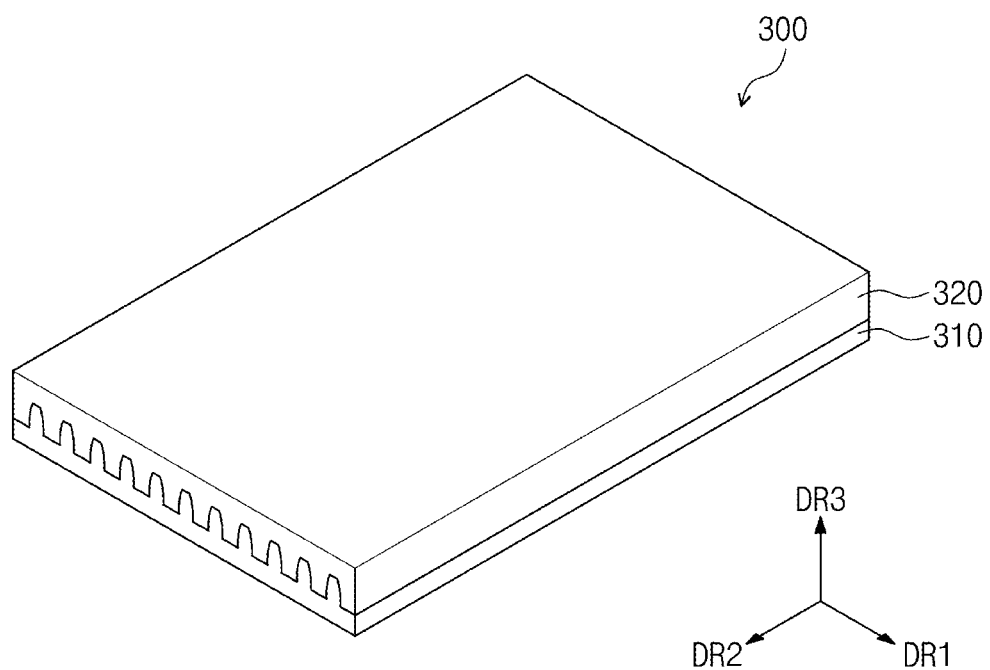
FIG. 5 is a perspective view of a light condensing member according to an exemplary embodiment of the inventive concepts.
Figure 6:
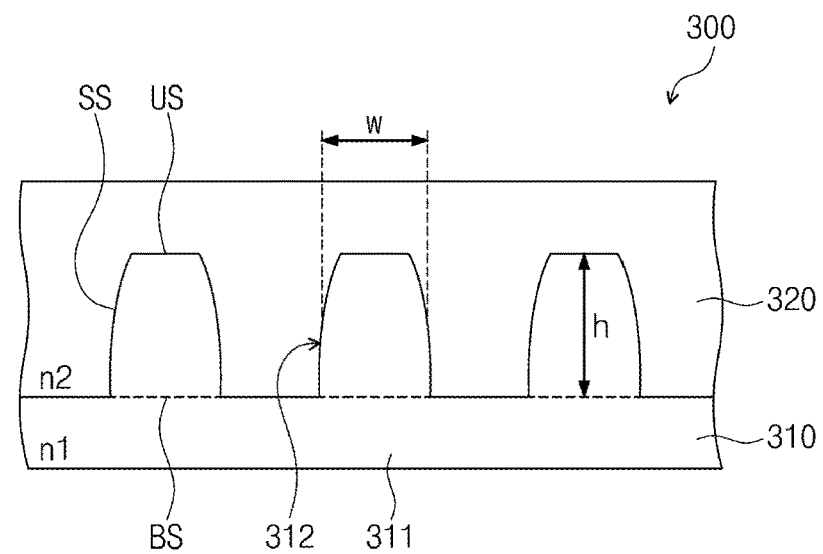
FIG. 6 is an enlarged cross-sectional view of a light condensing member according to an exemplary embodiment of the inventive concepts.
Figure 6:
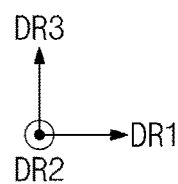

FIG. 5 is a perspective view of a light condensing member according to an exemplary embodiment of the inventive concepts, and FIG. 6 is an enlarged cross-sectional view of a light condensing member according to an exemplary embodiment of the inventive concepts.

Referring to FIGS. 5 and 6, the light condensing member 300 according to an exemplary embodiment of the inventive concepts includes a lower light condensing layer 310 and an upper light condensing layer 320. The lower light condensing layer 310 is disposed on a lower portion of the upper light condensing layer 320 to be coupled with the upper light condensing layer 320.

The lower light condensing layer 310 has a first refractive index n1. For example, the first refractive index n1 may be about 1.45 to about 1.55. The lower light condensing layer 310 includes a base layer 311 and a plurality of protrusions 312. The base layer 311 has a plate shape. The protrusions 312 may be disposed on the top surface of the base layer 311.

The protrusions 312 may be spaced apart from each other to have a predetermined distance in the first direction DR1, and may be extended in the second direction DR2. In this exemplary embodiment, the separation distance between the protrusions 312 is constant. However, the inventive concepts are not particularly limited to a constant separation distance between the protrusions 312. For example, to adjust the uniformity of the light provided from the display panel 200, the separation distances between the protrusions 312 may be set to be different from each other.

Each of the protrusions 312 includes an upper surface US, a side surface SS, and a bottom surface BS. The upper surface US and the bottom surface BS face each other. The upper surface US and the bottom surface BS have a planar shape. That is, the upper surface US may be a plane parallel to the top surface of the base layer 311. The bottom surface BS is in direct contact with the base layer 311.

The side surface SS connects the upper surface US and the bottom surface BS. The side surface SS is extended downward from an edge of the upper surface US. According to this exemplary embodiment, on a cross section, each of the protrusions 312 may include a plurality of side surfaces SS. The plurality of side surfaces SS face each other in the first direction DR1.

According to this exemplary embodiment, the height h of each of the protrusions 312 may be greater than or equal to the width W of each of the protrusions 312 in the first direction DR1.

Also, according to this exemplary embodiment, each of the side surfaces SS may have a curved shape. Specifically, the side surfaces SS of each of the protrusions 312 according to this exemplary embodiment has a convex shape on the outside of each of the protrusions 312 in the first direction DR1. For example, in a cross section, the side surfaces SS of each of the protrusions 312 may be a part of a semi-elliptical shape having a long axis in the third direction DR3. Therefore, each of the protrusions 312 may have a greater width W in the first direction DR1 as facing downward from the upper surface US.

Although not shown in the drawings, according to another exemplary embodiment of the inventive concepts, the lower light condensing layer 310 may include an adhesive material. In this case, the above-mentioned first adhesive member AD1 may be omitted.

The upper light condensing layer 320 is disposed on an upper portion of the lower light condensing layer 310 to cover the top surface of the lower light condensing layer 310. Specifically, the upper light condensing layer 320 covers regions exposed by the protrusions 312 of the regions on the top surface of the base layer 311, and the upper surfaces US and the side surfaces SS of the protrusions 312.

The upper light condensing layer 320 has a second refractive index n2. In this exemplary embodiment, the second refractive index n2 has a value greater than the first refractive index n1. For example, the second refractive index n2 may be about 1.55 to about 1.65.

Figure 7:
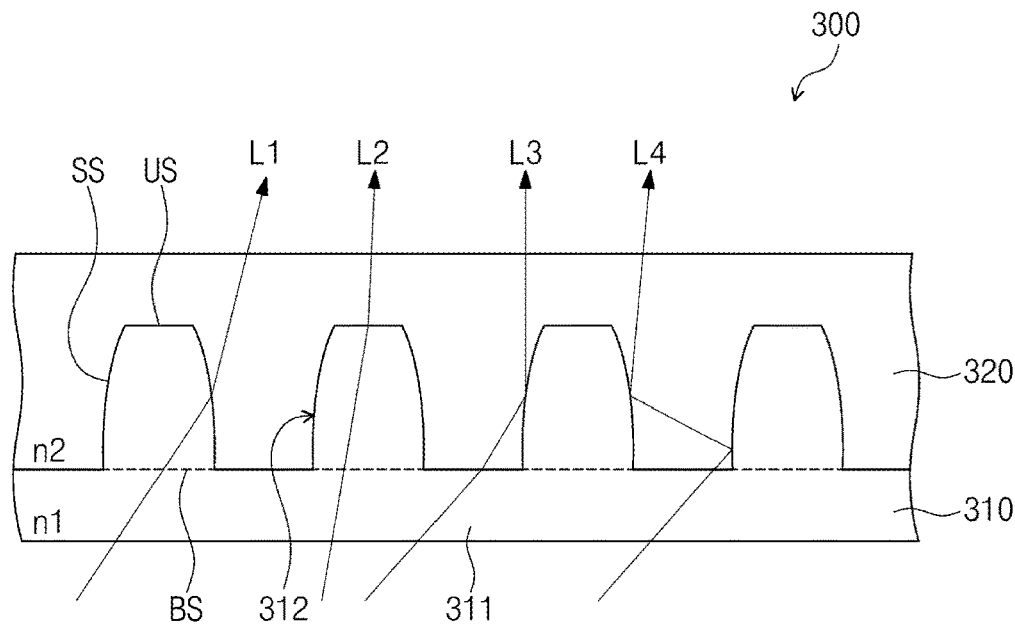
FIG. 7 is a schematic view showing the path of light entering onto a light condensing member.
Figure 7:
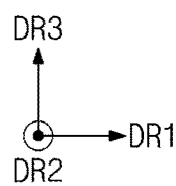

FIG. 7 is a schematic view showing the path of light entering onto a light condensing member. In FIG. 7, for convenience of explanation, paths of lights entering from the display panel 200 to the light condensing member 300 are exemplarily illustrated.

Referring to FIG. 7, lights L1 to L4 entering from the display panel 200 to the light condensing member 300 may be condensed in the upper direction by the protrusions 312 of the light condensing member 300.

For example, the first light L1 of the lights L1 to L4 entering from the display panel 200 to the light condensing member 300 is sequentially transmitted through the base layer 311 of the lower light condensing layer 310 and the protrusion 312, and enters onto the upper light condensing layer 320 through the upper surface US. In this case, due to the refractive index difference of the lower light condensing layer 310 and the upper light condensing layer 320, the first light L1 may be refracted in the upper direction.

The second light L2 of the lights L1 to L4 entering from the display panel 200 to the light condensing member 300 is sequentially transmitted through the base layer 311 of the lower light condensing layer 310 and the protrusion 312, and enters onto the upper light condensing layer 320 through the side surface SS. In this case, due to the refractive index difference of the lower light condensing layer 310 and the upper light condensing layer 320, the second light L2 may be refracted in the upper direction.

The third light L3 and the fourth light L4 of the lights L1 to L4 entering from the display panel 200 to the light condensing member 300 are transmitted through the base layer 311 of the lower light condensing layer 310 and enter onto the upper light condensing layer 320 through the top surface of the base layer 311. The third light L3 and the fourth light L4 entering onto the upper light condensing layer 320 may be reflected in the upper direction by the side surface SS of the protrusion 312.

According to this exemplary embodiment, the height h of each of the protrusions 312 may be greater than or equal to the width W of each of the protrusions 312 in the first direction DR1. That is, the amount of light entering onto the side surface SS of each of the protrusions 312 from the display panel 200 may be increased.

Specifically, the direction of the light L1 entering onto the upper surface US before entering onto the upper light condensing layer 320 may be adjacent to the upper direction than the directions of the lights L2 to L4 entering onto the side surface SS before entering onto the upper light condensing layer 320 are. According to this exemplary embodiment, the light condensing efficiency of the lights L2 to L4 which are not relatively adjacent to the upper direction may be increased.

In addition, according to this exemplary embodiment, since each of the protrusions 312 has a greater width as facing toward the bottom surface BS from the upper surface US, the amount of light entering onto the side surface SS may be increased.

As a result, according to this exemplary embodiment, the light condensing efficiency of the display apparatus 1000 may be improved.

Figure 8:
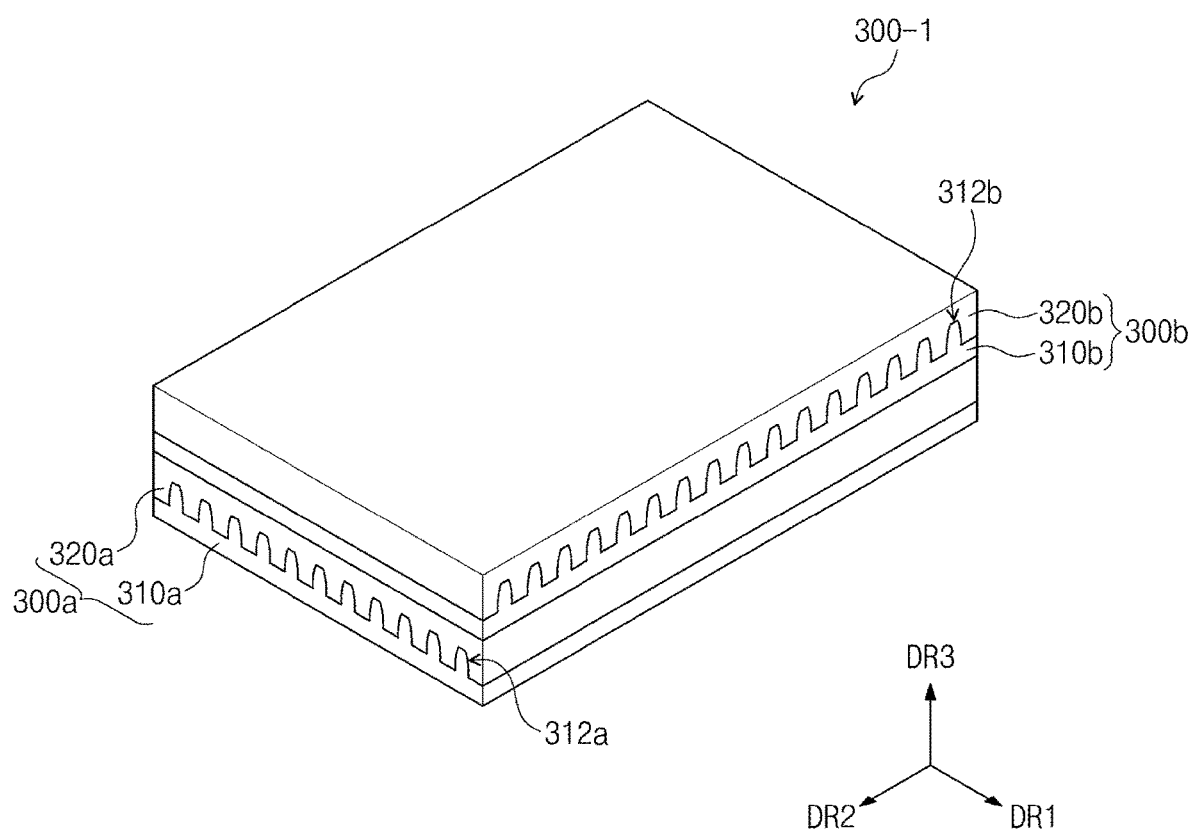
FIG. 8 is a perspective view of a light condensing member according to another exemplary embodiment of the inventive concepts.

FIG. 8 is a perspective view of a light condensing member according to another exemplary embodiment of the inventive concepts.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIG. 8, a light condensing member 300-1 according to another exemplary embodiment of the inventive concepts may be provided in plurality. The plurality of light condensing members 300-1 include a first light condensing member 300a and a second light condensing member 300b.

The first light condensing member 300a includes a first lower light condensing layer 310a and a first upper light condensing layer 320a. First protrusions 312a of the first lower light condensing layer 310a are arranged in the first direction DR1 and are extended in the second direction DR2.

The second light condensing member 300b is disposed on an upper portion of the first light condensing member 300a. The second light condensing member 300b includes a second lower light condensing layer 310b and a second upper light condensing layer 320b. Second protrusions 312b of the second lower light condensing layer 310b are arranged in the second direction DR2 and are extended in the first direction DR1.

According to this exemplary embodiment, the first light condensing member 300a condenses a first direction DR1 component of the incident lights, and the second light condensing member 300b condenses a second direction DR1 component of incident lights. Therefore, the amount of the light condensed by the light condensing members 300a and 300b may be increased. Furthermore, the light condensing efficiency of the display apparatus 1000 may be further improved.

Figure 9:
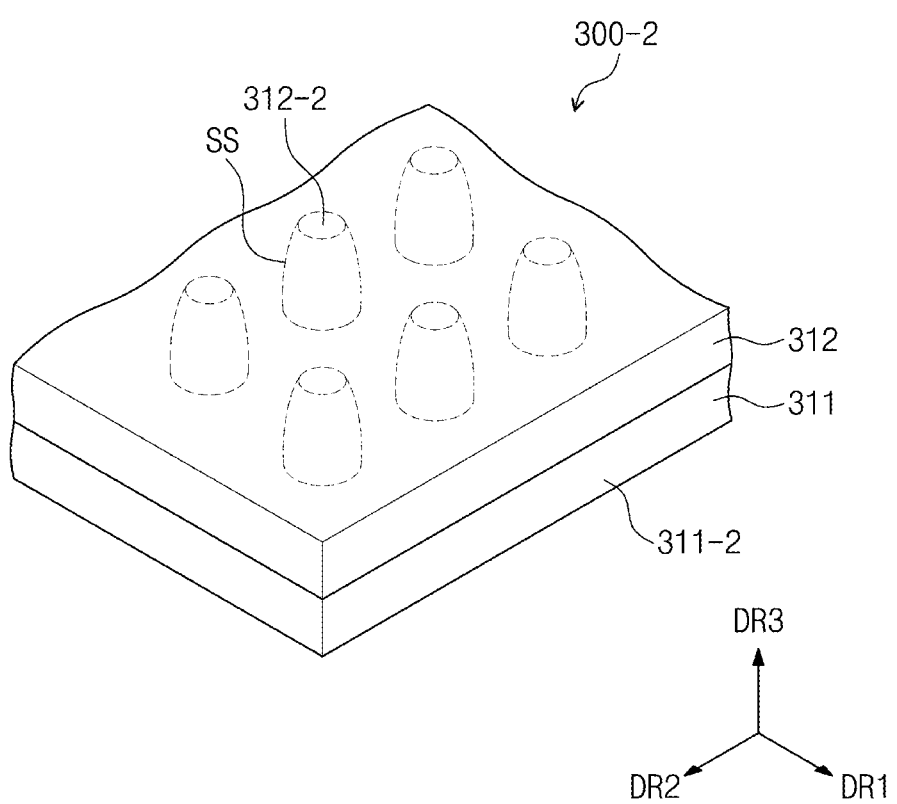
FIG. 9 is an enlarged perspective view of a light condensing member according to another exemplary embodiment of the inventive concepts.

FIG. 9 is an enlarged perspective view of a light condensing member according to another exemplary embodiment of the inventive concepts.

For convenience of explanation, differences from an exemplary embodiment of the inventive concept will be mainly described, and omitted parts are in accordance with an exemplary embodiment of the inventive concepts. In addition, the constituent elements described above are denoted by the same reference numerals, and redundant description of the constituent elements is omitted.

Referring to FIG. 9, a light condensing member 300-2 according to another exemplary embodiment of the inventive concepts includes a lower light condensing layer 310-2 and an upper light condensing layer 320-2.

Protrusions 312-2 of the lower light condensing layer 310-2 are disposed on an upper surface of a base layer 311-2. Each of the protrusions 312-2 may have a shape of a rotating body. For example, side surfaces of each of the protrusions 312-2 may be part of a semi-elliptical sphere.

According to this exemplary embodiment, the protrusions 312-2 may be arranged in a matrix form on the top surface of the base layer 311-2. Specifically, the protrusions 312-2 are arranged in the first direction DR1 and the second direction DR2. The inventive concepts are not particularly limited to this arrangement shape of the protrusions 312-2.

Figure 10:
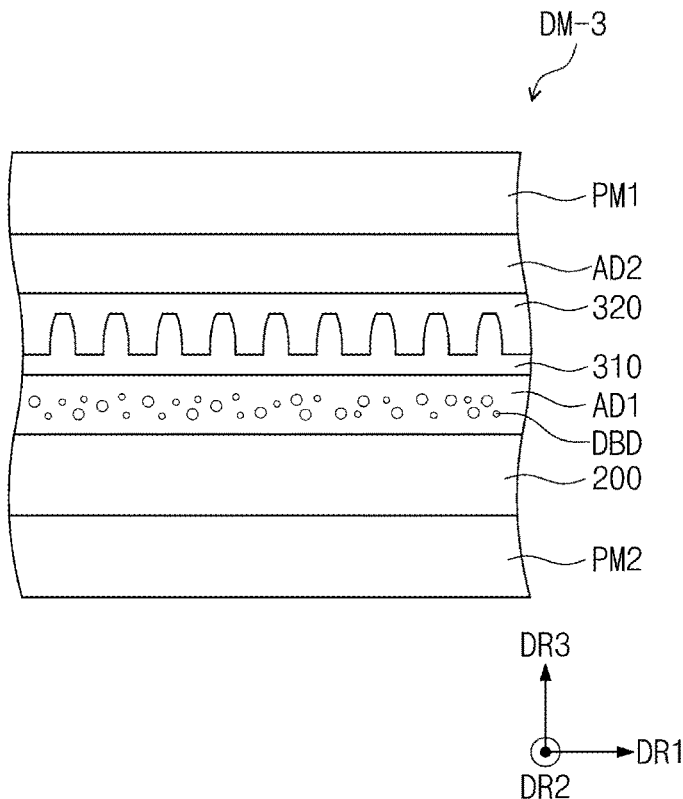
FIG. 10 is an enlarged cross-sectional view of a display module according to another exemplary embodiment of the inventive concepts.

FIG. 10 is an enlarged cross-sectional view of a display module according to another exemplary embodiment of the inventive concepts.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIG. 10, the first adhesive member AD1 of a display module DM-3 according to another exemplary embodiment of the inventive concepts may include a plurality of diffusion beads DBD. The diffusion beads DBD function to diffuse the light provided from the display panel 200. For example, the diffusion beads DBD may include silver. According to this exemplary embodiment it is possible to prevent a moire phenomenon occurring in an image provided from the display apparatus 1000.

Figure 11:
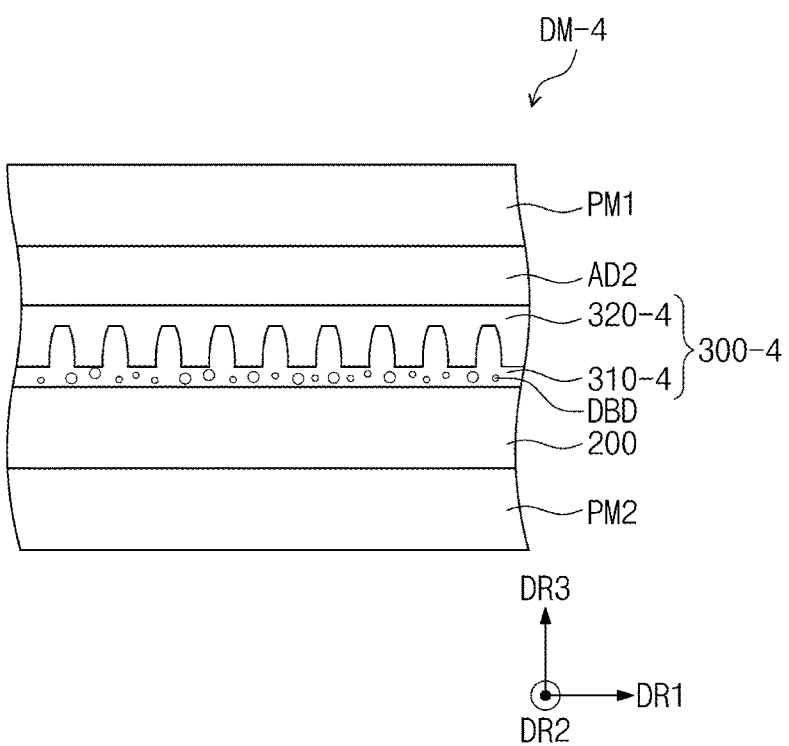
FIG. 11 is an enlarged cross-sectional view of a display module according to another exemplary embodiment of the inventive concepts.

FIG. 11 is an enlarged cross-sectional view of a display module according to another exemplary embodiment of the inventive concepts.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIG. 11, a lower light condensing layer 310-4 of a light condensing member 300-4 according to another exemplary embodiment of the inventive concepts may include the plurality of diffusion beads DBD. For example, the diffusion beads DBD may include silver. Also, the lower light condensing layer 310-4 of the light condensing member 300-4 may include an adhesive material. Therefore, the first adhesive member AD1 described above with reference to FIG. 3 may be omitted.

According to this exemplary embodiment, it is possible to prevent a moire phenomenon occurring in an image provided from the display apparatus 1000.

Figure 12:
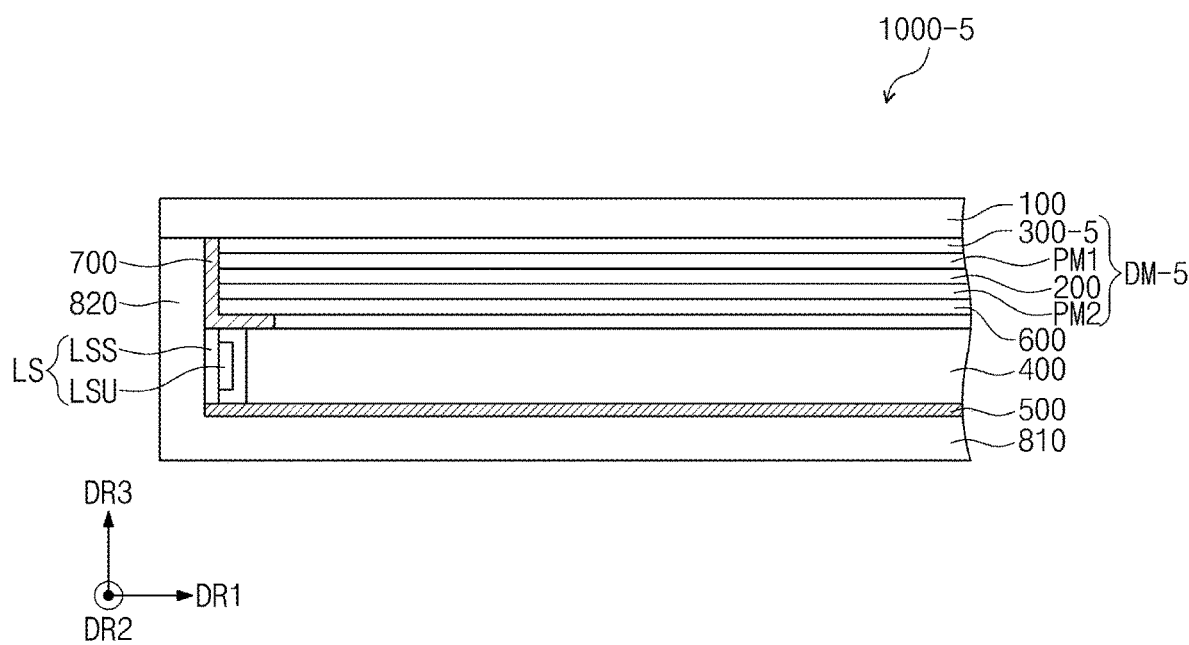
FIG. 12 is a cross-sectional view of a display apparatus according to another exemplary embodiment of the inventive concepts.

FIG. 12 is a cross-sectional view of a display apparatus according to another exemplary embodiment of the inventive concepts.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIG. 12, a display module DM-5 according to another exemplary embodiment of the inventive concepts includes the display panel 200, the first polarizing member PM1, the second polarizing member PM2, and a light condensing member 300-5.

According to this exemplary embodiment, the light condensing member 300-5 is disposed on an upper portion of the first polarizing member PM1. That is, the light condensing member 300-5 may be disposed at the uppermost position of the display module DM-5. In this case, it is possible to prevent the amount of light transmitted and absorbed by the first polarizing member PM1 from being changed by the phase delay which may be caused by the light condensing member 300-5. That is, the display quality of the display apparatus 1000 may be improved.

Figure 13:
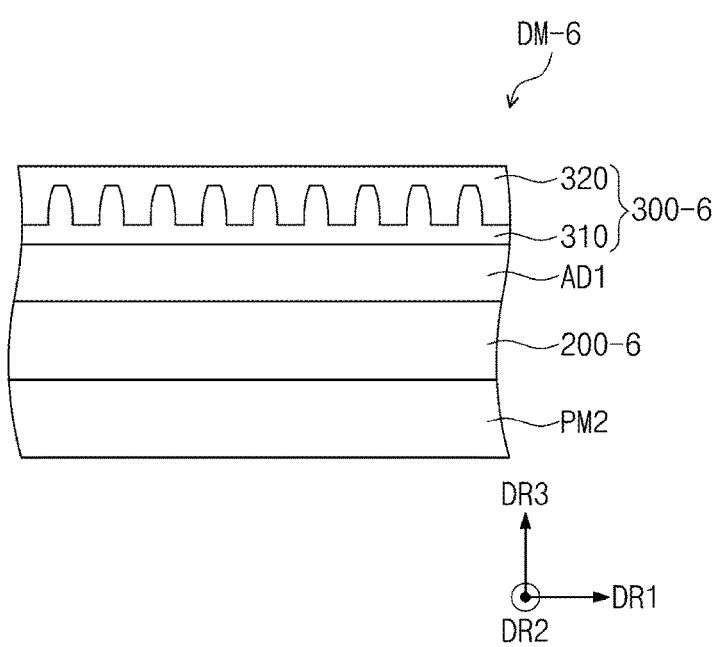
FIG. 13 is an enlarged cross-sectional view of a display module according to another exemplary embodiment of the inventive concepts.
Figure 14:
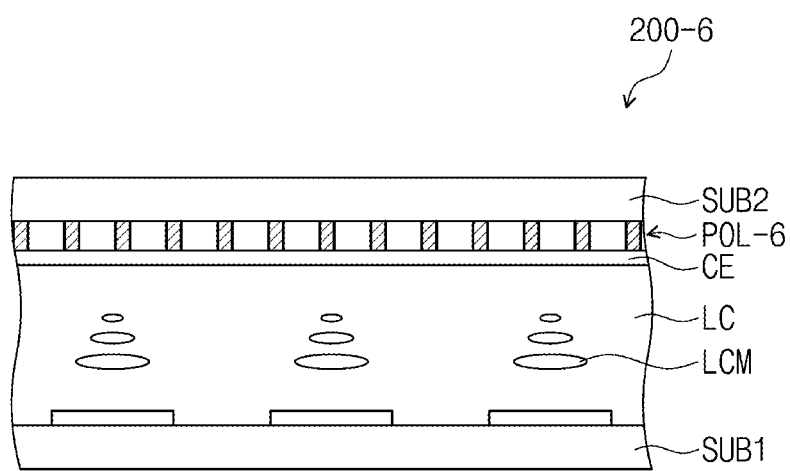
FIG. 14 is an enlarged cross-sectional view of a display panel shown in FIG. 13.

FIG. 13 is an enlarged cross-sectional view of a display module according to another exemplary embodiment of the inventive concepts, and FIG. 14 is an enlarged cross-sectional view of a display panel shown in FIG. 13.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIGS. 13 and 14, a display panel 200-6 of a display module DM-6 according to another exemplary embodiment of the inventive concepts may include a polarizing layer POL-6. That is, in this exemplary embodiment, the first polarizing member PM1 described above with reference to FIGS. 1 to 3 is omitted.

Specifically, the display panel 200-6 according to this exemplary embodiment further includes the polarizing layer POL-6. The polarizing layer POL-6 may be disposed between the second substrate SUB2 and the common electrode CE.

According to this exemplary embodiment, the polarizing layer POL-6 may be a wire grid polarizer (WGP). That is, the polarizing layer POL-6 has a form in which a plurality of nanowires extending in a predetermined direction are arranged. The polarizing layer POL-6 includes a metal material. For example, the polarizing layer POL-6 may include aluminum.

Figure 15:
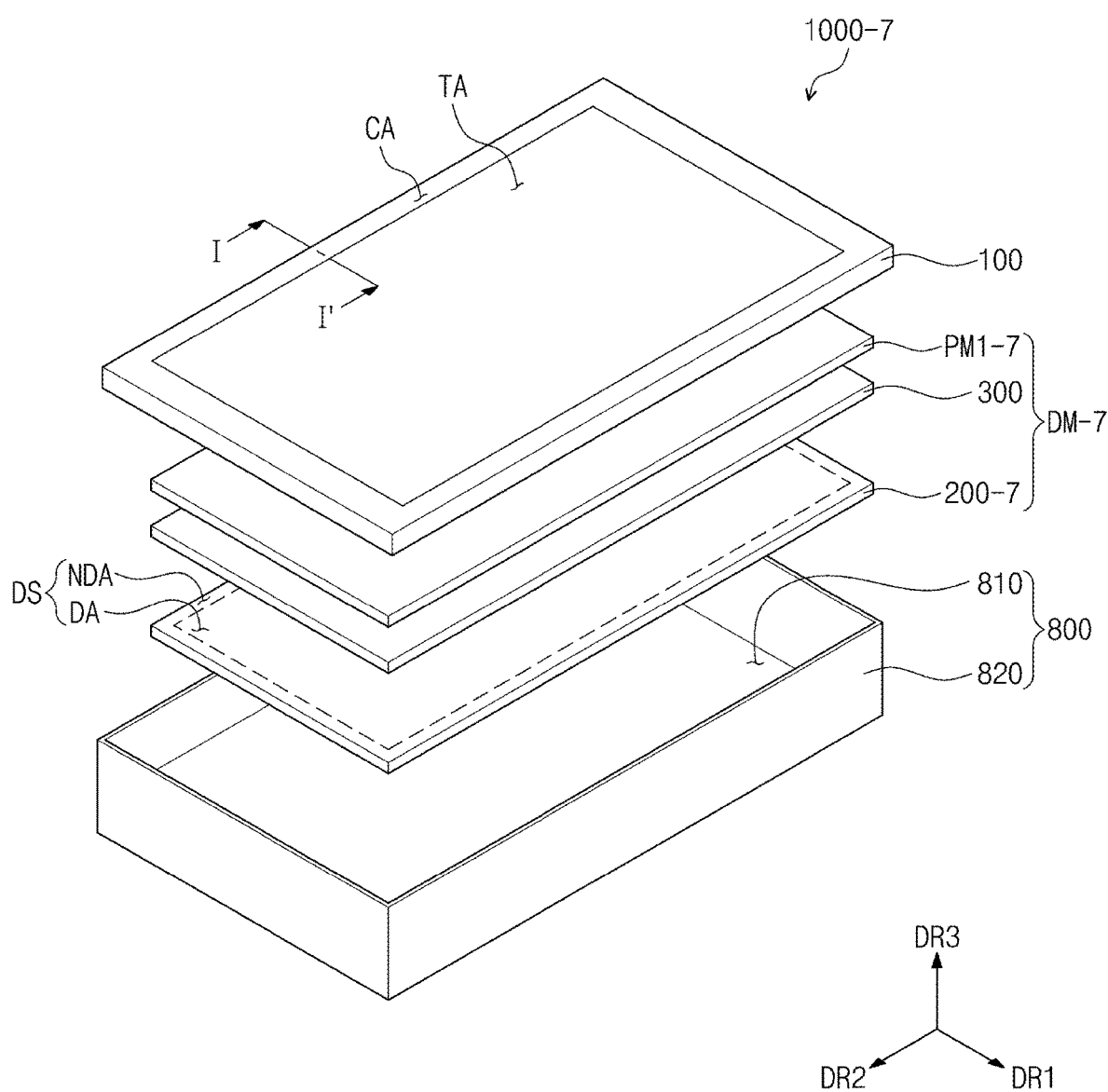
FIG. 15 is an exploded perspective view of a display apparatus according to another exemplary embodiment of the inventive concepts.
Figure 16:
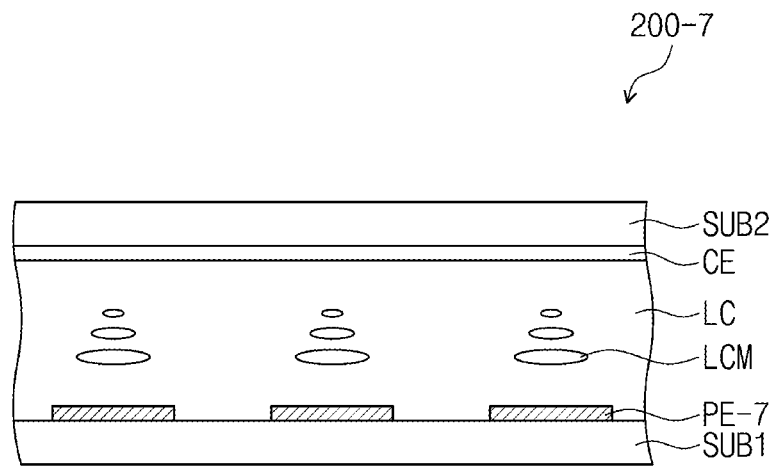
FIG. 16 is an enlarged cross-sectional view of a display panel shown in FIG. 15.
Figure 17:
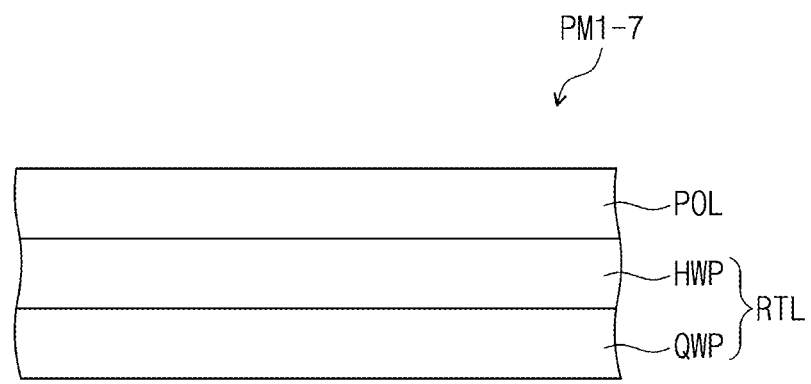
FIG. 17 is an enlarged cross-sectional view of a first polarizing member shown in FIG. 15.

FIG. 15 is an exploded perspective view of a display apparatus according to another exemplary embodiment of the inventive concepts, and FIG. 16 is an enlarged cross-sectional view of a display panel shown in FIG. 15. FIG. 17 is an enlarged cross-sectional view of a first polarizing member shown in FIG. 15.

For convenience of explanation, differences from an exemplary embodiment of the inventive concepts will be mainly described, and omitted parts are in accordance with an exemplary embodiment of the inventive concepts. In addition, the constituent elements described above are denoted by the same reference numerals, and redundant description of the constituent elements is omitted.

Referring to FIGS. 15 to 17, a display apparatus 1000-7 according to another exemplary embodiment of the inventive concepts may be a reflective display apparatus 1000-7. That is, the display device 1000-7 according to this exemplary embodiment may display an image by receiving external light provided from the outside. Therefore, according to this exemplary embodiment, the backlight unit BLU and the second polarizing member PM2 described above with reference to FIGS. 1 to 3 may be omitted.

Specifically, a display module DM-7 according to this exemplary embodiment includes a first polarizing member PM1-7, a display panel 200-7, and the light condensing member 300. The light condensing member 300 is disposed between a first polarizing member PM1-7 and the display panel 200-7. However, the inventive concepts are not limited thereto, and the light condensing member 300 may be disposed on an upper portion of the first polarizing member PM1-7.

A pixel electrode PE-7 of the display panel 200-7 according to this exemplary embodiment may include a reflective material. For example, the pixel electrode PE-7 may include aluminum. Therefore, the light provided from the outside is reflected by the pixel electrode PE-7, and the display apparatus 1000-7 may display an image using the reflected light through the display surface DS.

The first polarizing member PM1-7 includes a polarizing layer POL and a phase retarding layer RTL. The phase retarding layer RTL is disposed on a lower portion of the polarizing layer POL. The phase retarding layer RTL serves a role to delay the phase of one component of the light provided from the display panel 200-7. That is, the light which has passed through the phase retarding layer RTL may be polarized.

The phase retarding layer RTL according to this exemplary embodiment includes a half-wave film HWP and a quarter-wave film QWP. The half-wave film HWP is disposed between the quarter-wave film QWP and the polarizing layer POL.

The half-wave film HWP may be a phase difference film which delays the phase of one component of the incident light by $\lambda/2$. That is, the light provided from the outside is transmitted through the polarizing layer POL and linearly polarized so as to be parallel to the light transmission axis of the polarizing layer POL, and the linearly polarized light is transmitted through the half-wave film HWP such that the linear polarization direction may be changed.

The quarter-wave film QWP may be a phase difference film which delays the phase of one component of the incident light by $\lambda/2$. That is, the quarter-wave film QWP may convert the light provided from the half-wave film HWP from being in the linearly polarized state to being in the circularly polarized state.

The circularly polarized light is reflected by the pixel electrode PE-7 of the display panel 200-7 and enters again onto the quarter-wave film QWP, and the light transmitted through the quarter-wave film QWP is converted from being in the circularly polarized state to being in the linearly polarized state. The linearly polarized light is transmitted and absorbed by the half-wave film HWP and the polarizing layer POL, and an image may be finally displayed through the display surface DS.

In this exemplary embodiment, the phase retarding layer RTL includes one half-wave film HWP and one quarter-wave film QWP, but the inventive concept is not particularly limited to the type and the number of film which the phase retarding layer RTL has.

It will be understood by those skilled in the art that various changes in form and details may be made therein without departing from the spirit and scope of the inventive concepts as defined in the appended claims. In addition, the present exemplary embodiments disclosed herein are not intended to limit the technical spirit of the inventive concepts, and all technical ideas within the scope of the following claims and equivalents thereof should be construed as falling within the scope of the inventive concepts.

What is claimed is:

1. A display apparatus comprising:
   a display panel having a display surface on which an image is displayed;
   a light condensing member disposed above the display panel;
   a first polarizing member disposed above the light condensing member and configured to transmit one polarization component of the light provided from the display panel;
   a first adhesive member disposed between the display panel and the light condensing member; and
   a second adhesive member disposed between the light condensing member and the first polarizing member,
   wherein:
   at least one of the first adhesive member and the second adhesive member includes a plurality of diffusion beads and an adhesive material;
   the light condensing member comprises:
      a lower condensing layer having a base layer and a plurality of protrusions protruding upward from the base layer; and
      an upper condensing layer having a higher refractive index than the lower condensing layer and disposed over an upper portion of the lower condensing layer to cover a top surface of the lower condensing layer;
   the plurality of protrusions are spaced apart from each other to have a predetermined separation distance in a first direction;
   each of the plurality of protrusions has an upper surface having a planar shape and side surfaces extending downward from an edge of the upper surface; and
   a width of the upper surface of the plurality of protrusions is less than a width of the predetermined separation distance between each of the plurality of protrusions.

2. The display apparatus of claim 1, wherein the first adhesive member includes the plurality of diffusion beads and the adhesive material.

3. The display apparatus of claim 1, wherein the side surfaces of each of the plurality of protrusions, in a cross-section, are part of a semi-elliptical shape having a long axis in a direction normal to an upper surface of the base layer.

4. The display apparatus of claim 1, wherein the predetermined separation distances between each of the plurality of protrusions are different from each other.

5. The display apparatus of claim 1, wherein a height of each of the plurality of protrusions is greater than or equal to a width of the upper surface in the first direction.

6. The display apparatus of claim 1, wherein a width of each of the plurality of protrusions increases in the first direction as facing downward from the upper surface.

7. The display apparatus of claim 1, wherein the side surfaces of each of the plurality of protrusions has a curved convex shape protruding outwardly.

8. The display apparatus of claim 1, wherein a height of each of the plurality of protrusions is greater than or equal to a width of the predetermined separation distance between each of the plurality of protrusions.

9. The display apparatus of claim 1, wherein the base layer of the lower condensing layer includes the plurality of diffusion beads and the adhesive material.

10. The display apparatus of claim 1, wherein the light condensing member is provided in plurality, and plurality of light condensing members comprise a first light condensing member and a second light condensing member disposed over the first light condensing member.

11. The display apparatus of claim 10, wherein the first light condensing member comprising first protrusions arranged in a first direction and extending in a second direction crossing the first direction, and the second light condensing member comprising second protrusions arranged in the second direction, and extending in the first direction.

12. The display apparatus of claim 1, wherein the plurality of diffusion beads includes silver.

* * * * *